United States Patent [19]

Shibata et al.

[11] Patent Number: 4,991,456
[45] Date of Patent: Feb. 12, 1991

[54] INDUSTRIAL ROBOT

[75] Inventors: Kunio Shibata; Shinji Naruoka; Osamu Toyama, all of Kariya, Japan

[73] Assignee: Toyoda Koki Kabushiki Kaisha, Kariya, Japan

[21] Appl. No.: 524,857

[22] Filed: May 18, 1990

[30] Foreign Application Priority Data

May 19, 1989 [JP] Japan .................................. 1-127708

[51] Int. Cl.$^5$ ............................................. B25J 18/00
[52] U.S. Cl. ..................................................... 74/479
[58] Field of Search .............. 74/479, 665 C; 414/917; 901/14, 27, 50

[56] References Cited

U.S. PATENT DOCUMENTS

| 4,260,319 | 4/1981 | Matoda et al. | 901/14 X |
| 4,718,815 | 1/1985 | Lindgren | 901/27 X |
| 4,776,230 | 10/1988 | Susnjara | 74/479 |
| 4,807,486 | 2/1989 | Akeal et al. | 74/479 |

Primary Examiner—Richard E. Moore
Attorney, Agent, or Firm—Oblon, Spivak, McClelland, Maier & Neustadt

[57] ABSTRACT

An industrial robot utilizing a parallel link mechanism comprises a shoulder portion swingable about a vertical axis, which supports a first arm and a first link for swing movements about a common axis. A second arm pivoted at the end of the first arm for swing movement about a swing axis parallel to the common axis and being provided with a wrist portion at the front end thereof, while a second link is connected between the first link and the second arm so as to form a parallel link mechanism. Further, the second arm is provided with first and second connecting portions formed at the rear side and front sides of the second arm, respectively, with respect to the swing axis of the second arm. The first and second connecting portions are selectively connectable with one end of the second link using a connecting mechanism. In an application that the robot is placed on a floor, the second arm is assembled under a first condition that the first connecting portion is located in the back of the first arm in which the second link is located and the second link is connected to the first connecting portion. In an application that the robot is hung down from a ceiling, the second arm is assembled under a second condition that the second connecting portion is located in the back of the first arm in which the second link is located and the second link is connected to the second connecting portion.

4 Claims, 5 Drawing Sheets

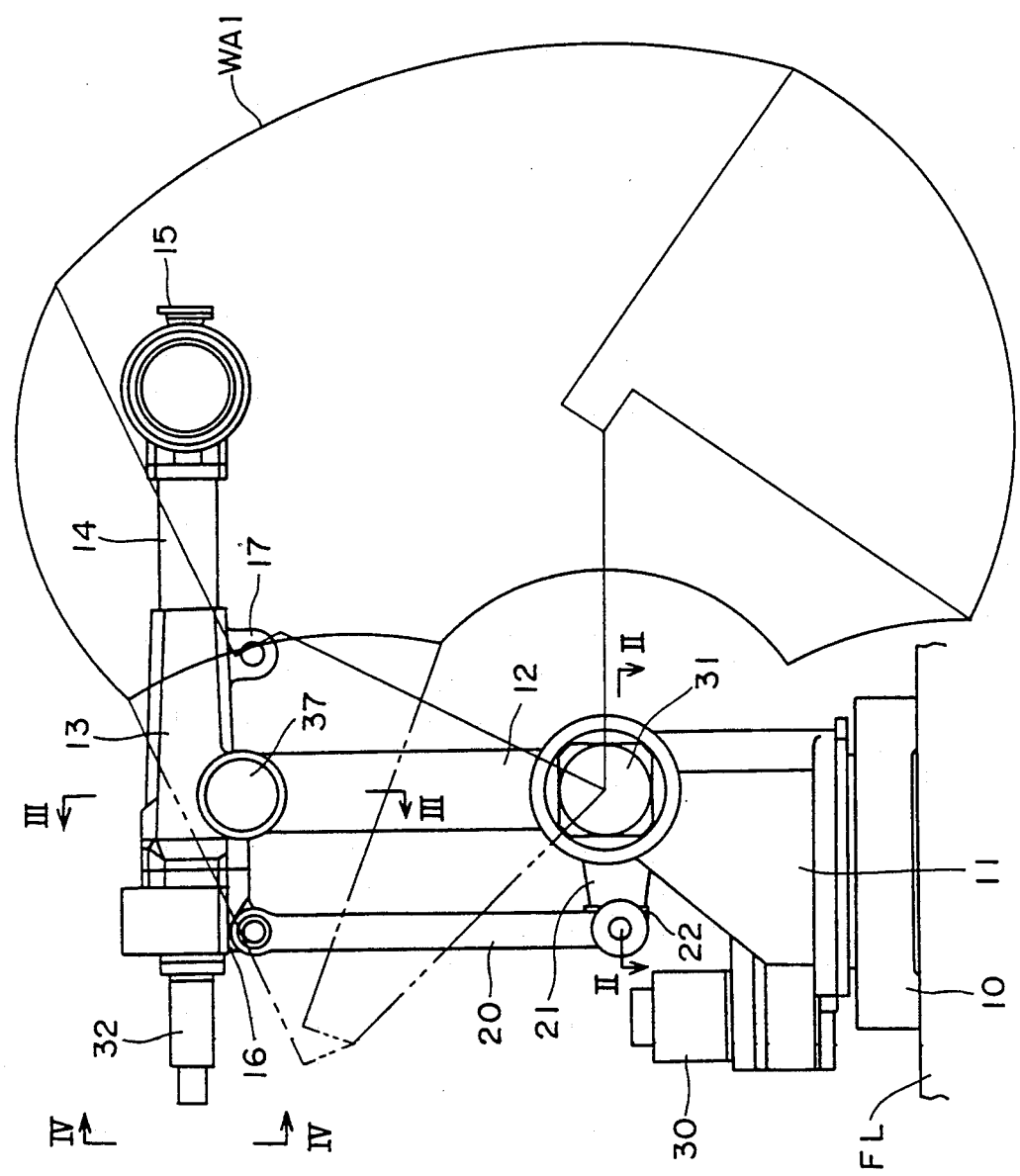

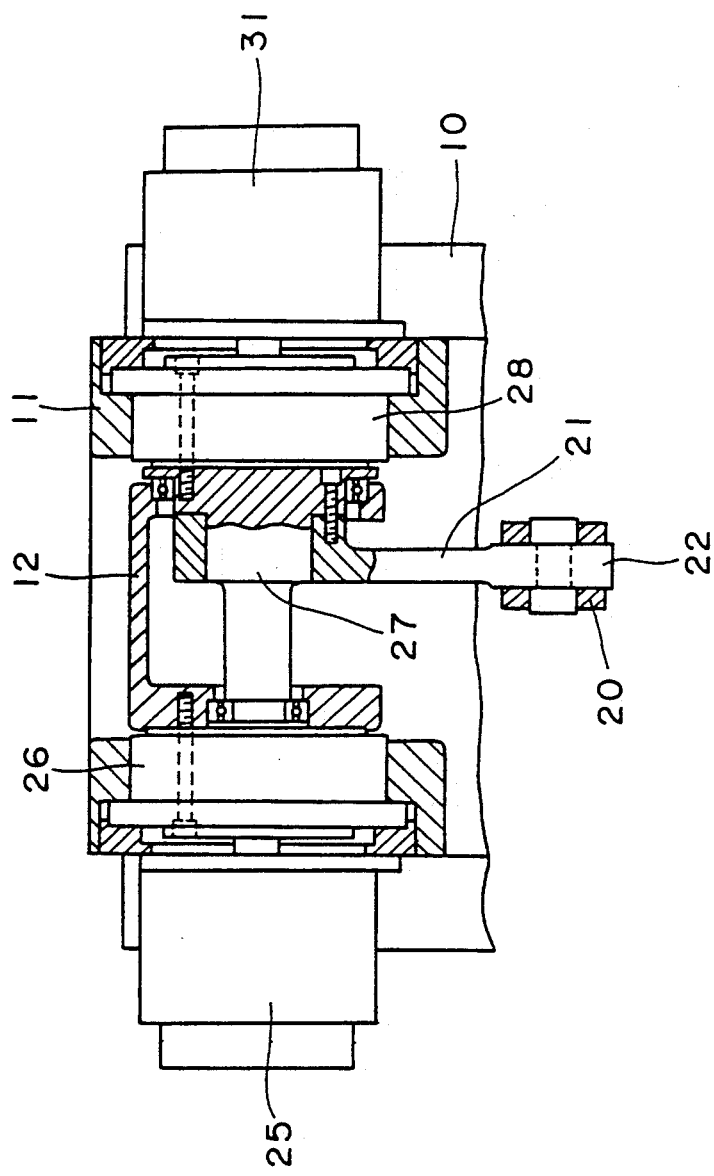

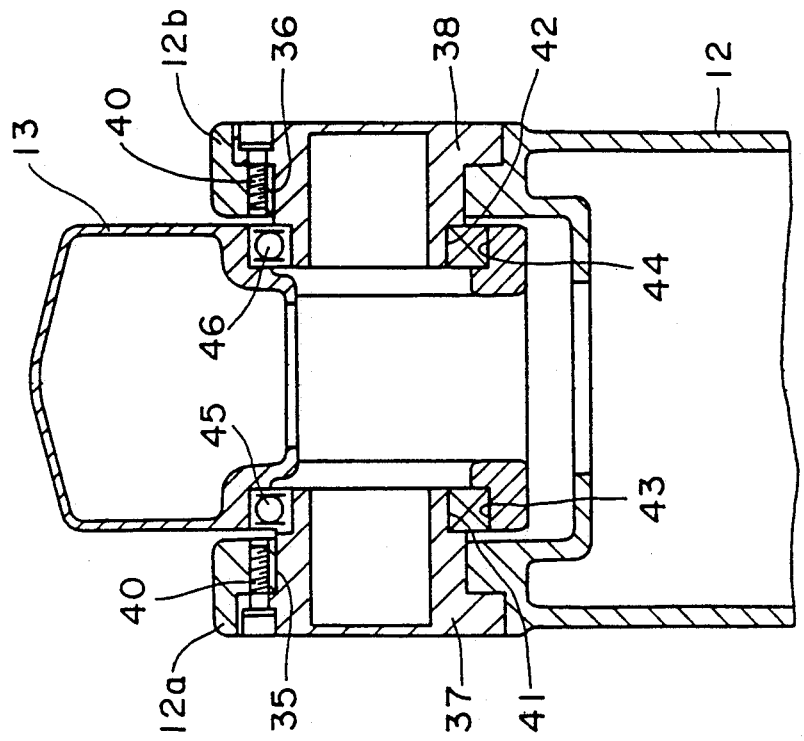

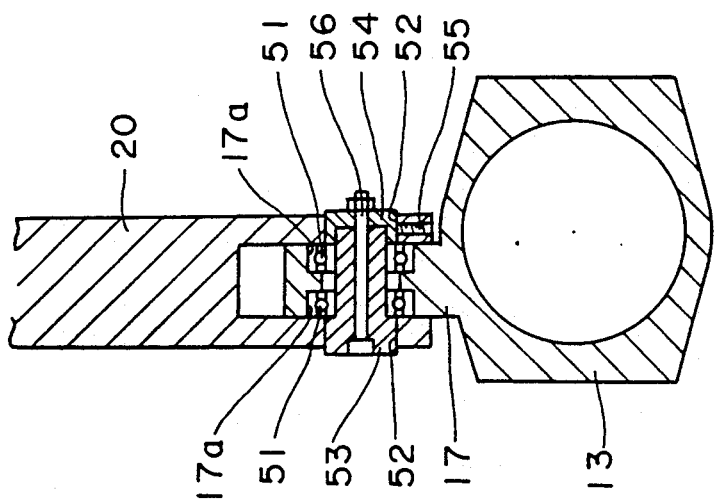

INDUSTRIAL ROBOT

BACKGROUND OF THE INVENTION

1. Field of the Invention

The present invention relates to an industrial robot utilizing a parallel link mechanism.

2. Discussion of the Prior Art

In an industrial robot of the above-mentioned type, a first arm and a first link are supported on the shoulder portion for swing movements about a common axis, while a mid portion of a second arm is pivoted at the upper end of the first arm for swing movement about a swing axis parallel to the common axis. Also, a second link parallel to the first arm is connected between the first link and the rear end of the second arm, thereby forming a parallel link mechanism together with the first arm, a rear portion of the second arm and the first link. Further, first and second motors for swinging the first arm and the first link, respectively, are mounted on the shoulder portion. The second arm is moved by a swing movement of the first link through the second link to be swung about the swing axis.

In such industrial robot, a wrist portion is attached to the front end portion of the second arm opposite to the rear end portion thereof, to which the upper end of the second link is connected. Therefore, the wrist portion cannot be moved far above the upper end of the first arm, thereby limiting the working area of the robot within an area in front of the first arm. Accordingly, such industrial robot can be used only in applications in which robots are placed on floors of plants (hereinafter referred to as floor installation applications). It cannot be used in applications in which robots are hung down from ceilings of plants (hereinafter referred to as ceiling installation applications). In the past, therefore, it is required to manufacture special industrial robots having a configuration suitable for the ceiling installation applications, if robots are required to be hung down from ceilings.

SUMMARY OF THE INVENTION

Accordingly, it is a primary object of the present invention to provide an improved industrial robot utilizing a parallel link mechanism which can be used in both of floor installation applications and ceiling installation applications.

Another object of the present invention is to provide an improved industrial robot capable of changing its working area by changing assembling direction of the second arm with respect to the first arm of the robot.

Briefly, the present invention provides an industrial robot which is provided with a first arm and a first link supported on a shoulder portion for swing movements about a common axis, a second arm pivoted at the front end of the first arm for swing movement about a swing axis parallel to the common axis, and a second link connected between the first link and the second arm. The second arm is provided with first and second connecting portions which are formed at the rear side and the front side of the second arm, respectively, with respect to the swing axis of the second arm, and which are connectable with the second link using a connecting mechanism. Further, the first arm is provided with a supporting mechanism so as to support the second arm under a first condition that the first connecting portion is located in the same side in which the second link is located and a second condition that the second connecting portion is located in the same side in which the second link is located.

With this configuration, the working area of the robot can be changed, by reassembling the second arm, between a first working area mainly located in front of the first arm, and a second working area located above the first arm under the condition that the robot is placed on a floor. Therefore, the industrial robot can be used in both of floor installation applications and ceiling installation applications.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 a side view of an industrial robot according to the present invention in a condition that the robot is placed on a floor;

FIG. 2 is an enlarged sectional view taken along the line II—II of FIG. 1;

FIG. 3 is an enlarged sectional view taken along the line III—III of FIG. 1;

FIG. 4 is an enlarged view taken along the line IV—IV of FIG. 1;

FIG. 6 is an enlarged sectional view taken along the line VI—VI of FIG. 5.

DETAILED DESCRIPTION OF THE PREFERRED EMBODIMENT

Figure 5:
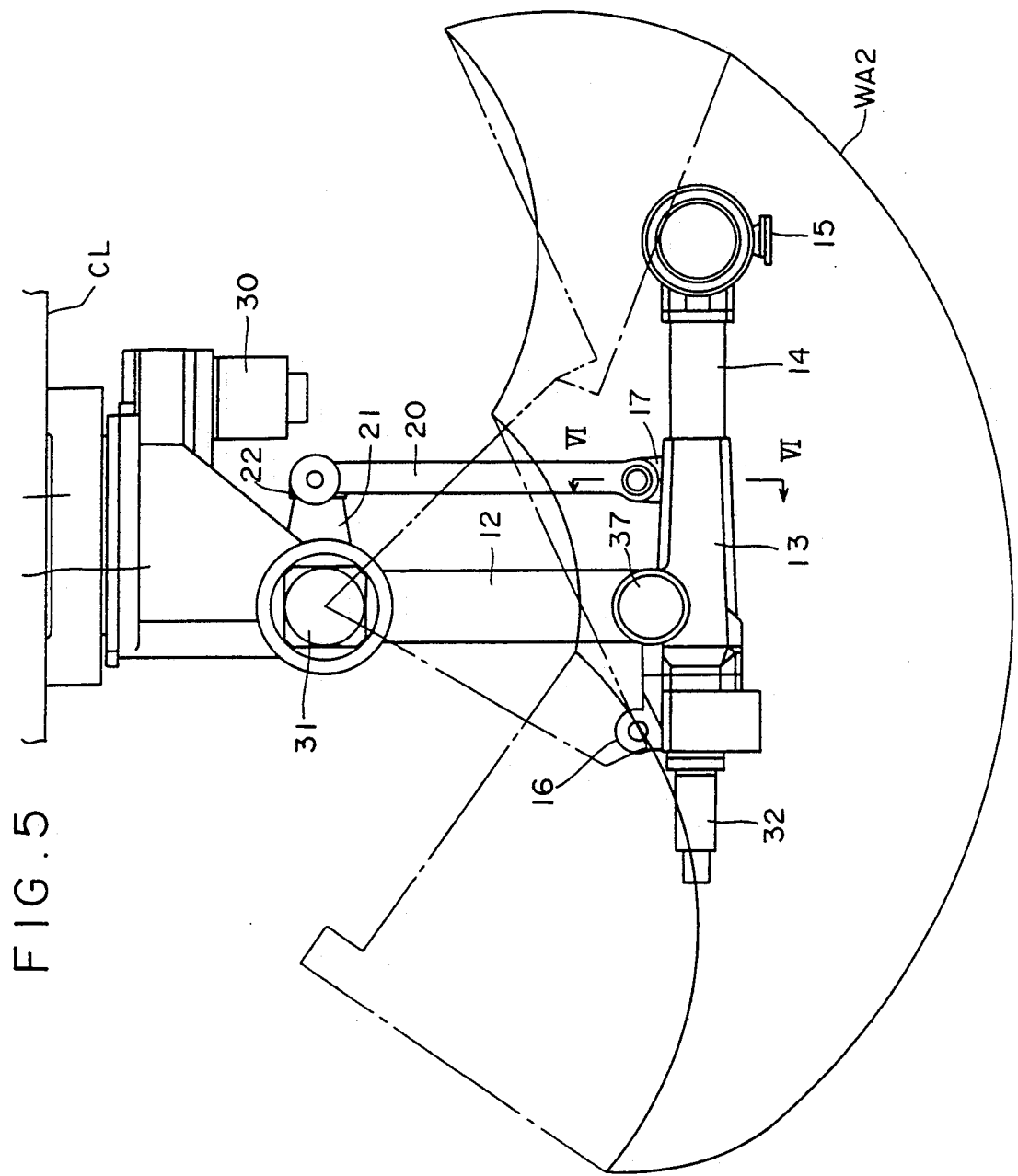
FIG. 5 is a side view of the industrial robot shown in FIG. 1 in a condition that the robot is hung down from a ceiling.

Referring now to the drawings and particularly, to FIG. 1 thereof, a base 10 placed on a floor FL supports a shoulder portion 11 for swing movement about a vertical first axis. On the shoulder portion 11, a first arm 12 is supported for swing movement about a horizontal second axis perpendicular to the first axis, while a second arm 13 is pivoted at the upper end of the first arm 12 for swing movement about a third axis parallel to the second axis. Also, a swivel wrist 14 is attached to the front end of the second arm 12 for rotational movement about a fourth axis perpendicular to the third axis, while a wrist portion 15 is attached to the front end of the swivel wrist 14 for another rotational movement about a fifth axis perpendicular to the fourth axis. Further, as shown in FIG. 2, a first link 21 is pivoted on the shoulder portion 11 through a swing shaft 27 for swing movement about the first axis, which is a common swing axis for the first arm 12 and the first link 21, while a second link 20 is connected between a connecting portion 22 of the first link 21 and the second arm 13, so that a parallel link mechanism is realized by the first arm 12, the second arm 13, the first link 21 and the second link 20.

A servomotor 30 is mounted on the shoulder portion 11 to swing the shoulder portion 11 with respect to the base 10, while servomotors 25 and 31 are also mounted on the shoulder portion 11 in order to swing the first arm 12 and the first link 21, respectively. Namely, the output shaft of the servomotor 25 is connected with the base portion of the first arm 12 through a reduction gear mechanism 26, wile the output shaft of the servomotor 31 is connected with the swing shaft 27 to which the first link 21 is secured. At the rear end of the second arm, servomotors 32 and 33 are mounted in order to rotate the swivel wrist 14 and the wrist portion 15, respectively.

The second arm 13 is provided with first and second connecting portions 16 and 17, which are formed at rear and front sides of the second arm 13, respectively. Therefore, the first and second connecting portions 16 and 17 are located in opposite side each other with respect to the third axis, i.e., the swing axis of the second arm 13. In floor installation applications, the upper end of the second link 20 is connected to the first connecting portion 16 of the second arm 13 in order to form a parallel link mechanism. The connecting portion 16 is provided with holes 16a by which a pair of rolling bearings 51 are received, as shown FIG. 4. At the forked upper end portion of the second link 20, a pair of connection holes 52 are formed in order to receive a connection shaft 53 and a cup member 54, respectively, and the cup member 54 is prevented from rotational movement with respect to the second link 20 using a screw 55. The connection shaft 53 is inserted into the roller bearings 51a and is secured to the cup member 54 using a bolt 56.

The first arm 12 is formed at its upper end with a pair of projecting portions 12a and 12b between which the second arm 12 is interposed, as shown in FIG. 3. The projecting portions 12a and 12b are formed with supporting holes 35 and 36, respectively, which are aligned with each other. Supporting shafts 37 and 38 are fitted into these supporting holes 35 and 36 and are secured to the projecting portions 12a and 12b using bolts 40. The supporting shafts 37 and 38 are formed at their inner ends with cylindrical supporting surfaces 41 and 42, which have the same diameter and are aligned with each other. On the other hand, the second arm 13 is formed with a pair of cylindrical holes 43 and 44 which have a diameter larger than that of the cylindrical supporting surfaces 41 and 42 of the supporting shafts 37 and 38. Furthermore, the outer races of a pair of rolling bearings 45 and 46 are fitted into the cylindrical holes 43 and 44, respectively, while the inner races thereof are fitted onto the cylindrical supporting surfaces 41 and 42. The second arm 13 is pivotably supported by the above-mentioned supporting shafts 37 and 38 and rolling bearings 45 and 46. Since the right-side and left-side cylindrical supporting surfaces 41 and 42 have the same dimension, and the right-side and left-side cylindrical holes 43 and 44 have the same dimension, the second arm 13 can be assembled to the first arm 12 in such a way that the wrist portion 15 is located in the back of the first arm 12, in which the second link 20 is located, as shown in FIG. 5. Although, in the above-mentioned embodiment, the supporting holes 35 and 36 have the same dimension each other as well a the cylindrical supporting surfaces 41 and 42, the cylindrical supporting surfaces 41 and 42 can be formed to have different diameters each other if the size of the rolling bearing 45 and 46 and/or the diameter of the cylindrical holes 43 and 44 are changed corresponding thereto. In the above-explained floor installation applications, the wrist portion 15 of the robot can be moved within a working area WA1 located in front of the first arm 12 as indicated by a solid line in FIG. 1.

FIG. 5 shows a side view of the industrial robot in an condition that the robot is hung down from a ceiling CL. In this ceiling installation application, the second arm 12 is assembled to the first arm 13 in such a way that the second arm 12 points to a direction opposite to that in the above-mentioned floor installation application, namely, in such a way that the second connecting portion 17 is located in the same side as that the second link 20 is located in. In this case, the second link 20 is connected to the second connecting portion 17 of the second arm 13. The second connecting portion 17 is provided with a pair of connection holes 17a, as shown in FIG. 6, and a pair of rolling bearing 51 are received by the connection holes 17a. The same connecting parts used for the first connecting portion 16 is used for connecting the second connecting portion 17 of the second arm 13 and the second link 20. In such ceiling installation applications, the wrist portion 15 can be moved within a working area WA2 mainly located below the the second arm 13, as indicated by a solid line in FIG. 5.

The operation of the above-mentioned robot will now be explained. When the servomotor 30 is actuated, the shoulder portion 11 is swung about the vertical first axis, while the the first arm 12 is swung about the horizontal second axis when the servomotor 25 is actuated. Further, when the first link 21 is swung by the servomotor 31, the second arm 13 is moved through the second link 20 in order to be swung about the horizontal third axis.

When the robot assembled for floor installation applications, as shown in FIG. 1, is required to be used in a ceiling installation application, the screw 55 is loosen and the bolt 56 is removed from the connection shaft 53. Then, the connection shaft 53, the cup member 54 and the rolling bearings 51 are taken out from the holes 16a of the connecting portion 16 and the connection holes 52 of the second link 20. With this operation, the upper end of the second link 20 is disconnected from the first connecting portion 16. Further, the supporting shafts 37 and 38 are removed from the rolling bearings 45 and 46 after the removal of bolts 40. After that, the second arm 13 is taken out from the pair of projecting portions 12a and 12b of the first arm 12, and is turned in a horizontal plane by 180 degrees in order to points the opposite direction. The second arm 13 is thereafter inserted into between the two projecting portions 12a and 12b, so that the cylindrical holes 43 and 44 are aligned with the supporting holes 35 and 36. After that, the pair of supporting shafts 37 and 38 are inserted into the rolling bearing 46 and 45, respectively, and the bolts 40 are screwed into the projecting portions 12a and 12b so that the supporting shafts 37 and 38 are secured to the projecting portions 12a and 12b, respectively. Further, after the insertion of the rolling bearings 51 into the holes 17a of the connecting portion 17, the second link 20 is swung to such a position that the connection holes 52 thereof are aligned with the holes 17a of the second connecting portion 17. After that, the connection shaft 53 and the cup member 54 are reassembled to the connecting portion 17 using the bolt 56 and screw 55 so that the second link 20 is connected with the second connecting portion 17 of the second arm 13, as shown in FIG. 5.

Although, in the above-mentioned embodiment, the connecting portions 16 and 17 are formed as a part of the second arm 13, it is possible to form the connecting portions 16 and 17 separately from the second arm 13, and mount those on the second arm 13.

Obviously, numerous modifications and variations of the present invention are possible in light of the above teachings. It is therefore to be understood that within the scope of the appended claims, the present invention may be practiced otherwise than as specifically described herein.

What is claimed is:

1. An industrial robot comprising a shoulder portion, a first arm and a first link supported on said shoulder portion for swing movements about a common axis, a second arm pivoted at the end of said first arm for swing movement about a swing axis parallel to the common axis and being provided with a wrist portion at the front end thereof, a second link connected between said first link and said second arm so as to form a parallel link mechanism together with said first arm, said second arm and said first link, and first and second motors for swinging said first arm and said first link, respectively, wherein said second arm is provided with a first connecting portion and a second connecting portion which are formed at the rear side and the front side of said second arm, respectively, with respect to the swing axis of said second arm, said first and second connecting portions being selectively connectable with said second link with a connecting mechanism; and said first arm is provided with a supporting mechanism for supporting said second arm under a first condition that said first connecting portion is located in the back of said first arm in which said second link is located and said second link is connected with said first connecting portion using said connecting mechanism, and a second condition that said second connecting portion is located in the back of said first arm in which said second link is located and said second link is connected with said second connecting portion using said connecting mechanism.

2. An industrial robot as set forth in claim 1, wherein said first arm is provided at the end thereof with a pair of projecting portions between which said second arm is interposed, and said supporting mechanism is composed of a pair of supporting shaft members each received within a pair of supporting holes formed at said projecting portions, and a pair of bearing means interposed between said supporting shafts and a pair of cylindrical holes formed on both sides of said second arm.

3. An industrial robot as set forth in claim 2, wherein said pair of supporting holes formed at said projecting portions have the same diameter as each other, and said pair of cylindrical holes formed on said second arm have the same diameter as each other.

4. An industrial robot as set forth in claim 2, wherein said second arm is supported in said first condition when said robot is used in an application in which said robot is placed on a floor, and said arm is supported in said second condition when said robot is used in an application in which said robot is hung down from a ceiling.

* * * * *